United States Patent Office 3,553,132
Patented Jan. 5, 1971

3,553,132
HEAT AND FLAME RESISTANT PYROLYZED CELLULAR MATERIAL AND PROCESS OF MAKING SAME
Michael Dunay, Fanwood, and Saunders E. Jamison, Summit, N.J., assignors to Celanese Corporation, New York, N.Y., a corporation of Delaware
No Drawing. Filed Feb. 26, 1968, Ser. No. 707,955
Int. Cl. C09k 3/28
U.S. Cl. 252—62                9 Claims

ABSTRACT OF THE DISCLOSURE

A solid organic foam having an inorganic compound, such as boric oxide or antimony oxide, substantially uniformly distributed therein is subjected to a pyrolysis treatment to produce a carbonized heat resistant material which finds utility in insulating and other similar applications. The resulting product retains the original cellular structure of the solid organic foam, exhibits enhanced resiliency at elevated temperatures, and is incapable of burning or evolving smoke or poisonous gases when subjected to an intense flame or heat. The product of the invention accordingly lacks the "total fire hazard" commonly exhibited by organic foam materials.

BACKGROUND OF INVENTION

In recent years cellular structural materials have been formed from a wide variety of plastics and elastomers. Such materials are commonly referred to as "foams" or "solid foams," and contain an appreciable quantity of substantially uniformly dispersed voids or cells.

The desirable physical properties of solid foams have resulted in ever-increasing demands by industry for such cellular materials. For instance, common applications for solid foams includes sponges, cushioning and packing materials, thermal and electrical insulation, sound-absorbing materials, and construction materials.

It has been known for many years that solid foam products may be rendered waterproof or fireproof by the incorporation of various agents within the same. See, for example, U.S. Pat. No. 1,966,437 to Bryant where the incorporation in cellulose foams of fireproofing chemicals, such as aluminum chloride, ammonium sulphate, ammonium phosphate, borax, boric acid, etc., is disclosed. Significant shortcomings have limited or prohibited, however, the use of such fireproof foams in many applications when their "total fire hazard" is considered.

The prior art has been concerned primarily with the inhibition of the flammability of otherwise combustible solid organic foam materials. However, even when this major goal is achieved through the incorporation of appropriate flame retarding agents, the resulting product has nevertheless tended to be thermally unstable. Such thermal instability becomes of prime importance when the foam material is subjected to elevated temperatures, e.g., temperatures created by the combustion of nearby materials. The thermal instability commonly leads to the evolution of excessive quantities of smoke as well as poisonous gases either directly through thermal decomposition, or indirectly through oxidative interaction with air.

Those interested in the relative safety offered by various materials to their users are becoming increasingly aware of the "total fire hazard" concept. This concept takes into consideration whether the material is apt to evolve smoke or toxic gases when subjected to flame or elevated temperatures such as would be encountered upon the combustion of nearby flammable materials. For instance, it is generally recognized that smoke inhalation or the inhalation of toxic gases evolved from an organic foam may be lethl, and thereby present a problem of at least equal magnitude to that arising from the potential flammability of the foam. In many instances the potential evolution of toxic gases is the most important consideration when a solid organic foam is considered for a given application.

If combustion of the organic foam is merely retarded by the presence of various additives then there is a possibility that substantial quantities of carbon monoxide as well as other carbon compounds will result from the partial burning of the organic foam. If halogen compounds are present in the foam either by way of its composition or as fire-retardant additives, then gases such as hydrogen chloride may be evolved upon the application of intense heat or flame. Also, various nitrogen oxides may be evolved from foam materials formed from polyurethanes or polyamides.

Asphyxiation resulting from the inhalation of smoke, or the gaseous products evolved upon the decomposition, disintegration, or partial or complete combustion of an organic foam is recognized as a serious hazard. In fact, many fire fatalities may be traced to asphyxiation which resulted at a considerable distance from the point of combustion. There has accordingly arisen a need for an organic foam material which lacks the "total fire hazard."

It is an object of the invention to provide a process for efficiently converting an organic foam into a heat and flame resistant material which lacks a "total fire hazard" and which possesses a combination of highly desirable physical properties.

It is an object of the invention to provide a heat and flame resistant material which retains the original cellular configuration of its solid foam precursor.

It is another object of the invention to provide a heat and flame resistant cellular material which exhibits enhanced resiliency at elevated temperatures.

It is a further object of the invention to provide a heat and flame resistant cellular material which is incapable of burning or evolving smoke or poisonous gases when subjected to an intense flame or heat.

These and other objects, as well as the scope, nature and utilization of the invention will be apparent from the following detailed description and appended claims.

SUMMARY OF INVENTION

It has now been discovered that a process for the production of heat and flame resistant cellular materials comprises pyrolyzing at a temperature of about 400 to 700° C. an essentially moisture free solid organic foam having an inorganic compound substantially uniformly distributed therein selected from the group consisting of antimony oxide, boric oxide, a compound capable of yielding boric oxide upon heating, and a compound capable of yielding antimony oxide upon heating, to produce a carbonized product which retains the original cellular structure of the solid organic foam, exhibits enhanced resiliency at elevated temperatures, and is incapable of burning or evolving smoke or poisonous gases when subjected to an intense flame or heat.

DESCRIPTION OF PREFERRED EMBODIMENTS

A wide variety of solid organic foams may be selected for use as the precursor foam in the present process. Such foams are characterized as being organic solids which contain an appreciable quantity of substantially uniformly dispersed voids or cells. The foams utilized in the process are capable of withstanding the pyrolysis treatment while in the presence of an inorganic compound, as defined in detail hereafter, without the destruction of the original cellular configuration. Such organic foams by necessity must not depolymerize to any substantial degree while in the presence of the inorganic compound (described in detail hereafter) during the process. Solid foams may be selected which are of either the open-celled or the closed-celled type. As will be readily apparent to those skilled in solid foam technology, a variety of standard foam forming techniques are available for use in the formation of the precursor foam. For instance, a blowing agent may be incorporated into a resin which upon heating liberates a gas, air may be whipped into a suspension and allowed to set into a porous mass, gas may be injected into a suitable mass, a solvent may be flash-vaporized from a liquid mix, or a soluble solid which has been intimately admixed with the foam-forming mass may be removed by leaching with a suitable solvent.

A preferred solid organic foam suitable for use in the present invention is a cellulose foam. Cellulose foams may be formed by agitating a composition comprising a fibrous vegetable material, a wetting agent and an adhesive until a porous mass is formed, which is subsequently dried. In a particularly preferred embodiment of the invention, a suitable precursor cellulose foam generally may be formed according to teachings present in United States application Ser. Nos. 543,083, filed Apr. 18, 1966; 562,095, filed July 1, 1966; and 578,142, filed Sept. 9, 1966; which are herein incorporated by reference.

As discussed in detail in Ser. No. 543,083 a cellulose foam may be formed by agitating a mixture comprising (1) a fibrous cellulose material, (2) a wetting agent, (3) water, (4) a suitable thickening material such as sodium carboxymethyl cellulose, and (5) a dispersion of certain film-formable water-insoluble resins, and thereafter drying the foam, and if desired, curing the foam (when a curable resin is employed).

For most end products, the exact nature of the fibrous starting material utilized in a cellulose foam is not critical. Wood pulps of moderate alpha cellulose content represent a convenient source for cellulose fibers. Also, cotton linters represent a readily available cellulose fiber source. The fiber length is advantageously less than ½ inch, and desirably less than ¼ inch. Longer fibers are more difficult to disperse, but may be present in small amounts (e.g. about 1 to 10 percent to add strength).

The relative proportions of fibrous cellulose material and water employed should be such as to yield a tractable slurry. Generally this calls for a weight ratio of water to cellulose fiber of at least about 10:1. The amount of fibrous material that should be present in the dried precursor foam product can be varied over a wide range, depending upon the properties and uses desired. Generally the fibrous material should constitute about 50 to 85 percent, by weight, based on the total weight of the dried foam product in the absence of the inorganic compound described in detail hereafter.

The nature of the wetting agent utilized in cellulose foams is not critical except that it should be compatible with the other ingredients used and one which has the property of foaming relatively stable bubbles or foam in their presence. Exemplary of such wetting agents are sodium lauryl sulfate, particularly a grade containing some free lauryl alcohol, the glucoside saponin, salts (particularly sodium salts) of long chain sulfonic acids such as long chain alkylbenzene sulfonic acids, long chain alkanolamides such as lauric mono or diethanolamide, alkylphenolethylene oxide condensation products and long chain quaternary ammonium compounds such as hexadecyltrimethyl-ammonium bromide. The proportion of wetting agent is advantageously in the range of about 0.2 to 2 percent based on the weight of water in the slurry.

The water-insoluble resin present in the preferred cellulose foam serves as an adhesive for the fibrous cellulose material and has the ability to foam a continuous film upon the evaporation of the water, as well as be capable of withstanding the pyrolysis treatment described in detail hereafter. Either homopolymers or copolymers may be employed in the cellulose foams. Exemplary of suitable resins are polyvinyl acetate, polyvinylidene chloride, polyvinyl chloride, and acrylonitrile. Homopolymers of styrene and polybutyl acrylate are not suitable resins for use in this invention. Numerous commercial resin formulations are available which are suitable for use in cellulose foams. For example, a polyvinyl acetate homopolymer emulsion containing approximately 55 percent solids by weight may be utilized. The film-formable water-insoluble resin provides structural continuity to the cellulose precursor foam which would otherwise be lacking.

The film-forming water-insoluble resin should be added as a dispersion, preferably an aqueous dispersion, in an amount such as to be present in the precursor cellulose foam in a minor concentration generally less than 50 percent, e.g. within the range of about 5 to 45 percent, based on the total weight of the dried foam in the absence of the inorganic compound described in detail hereafter. In some cases, it will be necessary to supply somewhat more resin to the slurry than will appear in the final product, since some of the resin may appear in the liquid draining from the foam.

Suitable thickening materials for use in a preferred embodiment of the present invention are polyelectrolytes such as the water soluble salts of carboxymethyl cellulose, e.g. sodium, ammonium, calcium, and potassium carboxymethyl cellulose, sodium alginate and other water-soluble alginates, poly (sodium acrylate), poly (ammonium acrylate) and copolymers containing these acrylic monomers. The polyelectrolyte thickening materials should be present in an amount by weight of about from 0.2 to 5 percent, preferably 1 to 3 percent, based on the total weight of dried foam in the absence of the inorganic compound described in detail hereafter. It is not essential that thickening agents be utilized in the process. Such agents do, however, make possible the more uniform distribution of the film-formable water-insoluble resin or adhesive throughout the solid organic foam. Non-electrolytic thickening agents such as starch may also be utilized.

The mixture of ingredients which is capable of forming the cellulose precursor foam may be dried in order to insure the formation of a polymer film upon the fibrous cellulose material. Drying may be accomplished by subjecting the wet foamed materials, after appropriate drainage, to temperatures of about 100 to 200° C. for a suitable period of time. For instance, drying may be conveniently performed by placing the drained foam in an oven at about 120° C. for several hours. In the case of the curable materials, curing can readily be completed by then subjecting the dried and partially cured foam to a temperature of about 150 to 250° C.

Another preferred solid organic foam suitable for use in the present invention is a cellulose viscose foam. Such viscose foams may be prepared according to conventional techniques. For instance, cellulose may be soaked in alkali to form a mixture which is combined with carbon disulfide to form a viscose solution (cellulose xanthate). Water-soluble salts, such as sodium phosphate, sodium sulfate, sodium chloride, etc. are next mixed with the viscose solution in a considerable quantity. The solution is next coagulated by the application of heat and caused to release carbon disulfide with the concomitant decomposition of the cellulose xanthate. The resulting product is next washed free of the water-soluble salts to form a viscose foam or sponge.

In addition to the cellulose and cellulose viscose foams heretofore identified, it is possible for the solid organic precursor foam to be formed primarily from polyvinyl alcohol, polyvinylidene chloride, polyamides, polybenzimidazoles, and polyoxazoles. Those solid organic foams of cellulosic origin are particularly suited for use in the present process, and offer significant advantages from an economic standpoint.

It is essential that an inorganic compound such as antimony oxide (antimony trioxide) or boric oxide (boric anhydride) be substantially uniformly distributed throughout the solid organic foam during the pyrolysis treatment. Alternatively, compounds which are capable of yielding boric oxide upon heating may be incorporated in the foam, e.g. ammonium borate, boric acid, etc. Compounds which are capable of yielding antimony oxide upon heating may likewise be utilized. The inorganic compound is present in the dried organic foam immediately prior to the pyrolysis treatment in a concentration of about 40 to 60 percent, and preferably in a concentration of about 50 percent by weight based upon the total weight of the precursor foam immediately prior to pyrolysis. The inorganic compound utilized in the process serves the function of shielding the solid organic foam from the pyrolysis treatment and to thereby form a flame and heat-resistant material.

The inorganic compound may be incorporated within the solid organic foam (1) during the foam formation procedure, or (2) after foam has formed. For instance, the inorganic compound may be simply admixed with the other foam-forming ingredients so that a substantially uniform distribution of the compound throughout the resulting foam is assured. Also, equally satisfactory results may be accomplished by soaking a previously formed open-celled foam in a solution, e.g. heated aqueous solution, of the inorganic compound. The inorganic compound may be incorporated in a previously formed closed-cell foam by soaking such a foam in a liquid containing the compound which has the ability to swell the foam and to enable the compound to gain access to the internal portions of the foam.

Prior to the pyrolysis treatment of the instant process, it is recommended that the solid organic foam containing the inorganic compound be essentially free of moisture, i.e., contain less than about 5 percent moisture by weight. Drying of the foam prior to pyrolysis may be conducted by any of a variety of conventional procedures. For instance, the foam may be simply allowed to stand at room temperature over an extended period of time so that an excess moisture is evaporated. Preferably, however, the foam is placed in a circulating air oven maintained at about 100 to 200° C. for approximately one to two hours so that volitilization of excess moisture takes place at a more efficient rate.

The pyrolysis treatment is conducted by heating the solid organic foam containing the inorganic compound at a temperature of about 400 to about 700° C. The particularly preferred pyrolysis temperature is about 450° C. The pyrolysis treatment preferably is conducted in an air atmosphere. However, the treatment may likewise be satisfactorily conducted in an inert atmosphere. Weight losses of about 40 percent by weight commonly occur during the pyrolysis treatment based upon the weight of the dried foam immediately prior to pyrolysis. Heating times commonly required to produce the desired porous product vary with the pyrolysis temperature utilized as well as the thickness and the moisture content of the foam. The pyrolysis treatment may commonly be conducted within about 1 to 30 minutes. At the particularly preferred pyrolysis temperature of about 450° C. the pyrolysis treatment may satisfactorily be completed within about 1 to 15 minutes. When foams of great thickness are utilized, then an extended heating period may be required. If pyrolysis temperatures much below about 400° C. are utilized incomplete pyrolysis is commonly encountered. If pyrolysis temperatures much above about 700° C. are utilized for extended periods, then an inordinately large material loss may tend to occur. Suitable equipment in which the pyrolysis treatment may be conducted includes muffle furnaces, or any apparatus capable of producing an open flame. During the pyrolysis step of the instant process the inorganic compound forms a viscous melt and substantially coats the solid organic foam in such a manner so as to prevent combustion.

The cellular material formed according to the present invention retains the original cellular structure of the organic foam prior to the pyrolysis treatment. The product is black in appearance, and is capable of exhibiting enhanced resiliency at elevated temperatures, i.e., above about 250° C. At room temperature the product is rigid and may be cut or fabricated by conventional techniques. Desired shapes may be imparted to the product at elevated temperatures through compression procedures. Such shapes are retained upon cooling. The product is incapable of burning or evolving smoke or poisonous gases when subjected to an intense flame or heat such as produced by a Bunsen or Meeker burner.

The product of the present process is particularly suited for use in applications in which it is essential that high temperatures be endured, e.g. above about 300° C. Insulating materials, sound absorbents, and packing materials may be formed from the carbonized product.

The carbonized product is particularly suited for use in the formation of non-load bearing laminated interior wall partitions. In such an application, a capping of the carbonized product with a ceramic or other heat resistant material is desirable to prevent damage to the same. Such partitions offer the builder a light-weight, labor-saving, factory-finished component which offers improved safety features in the event of fire. Not only is the product non-burning, but it is also incapable of smoking or evolving deadly gases. When finished with a white or other light-colored ceramic coating, the product of the invention may be employed on the external walls of buildings for protection against thermal radiation. The lightness of the product also makes it of particular usefulness as insulation for aircraft, or in aircraft heat-shield applications.

The resiliency of the carbonized product at elevated temperatures, makes the endurance of shock possible which would tend to destroy other materials. For instance, when a piece of gypsum board is heated to 500 to 800° C. it tends to become extremely brittle so that any shock will severely damage the same. However, the product of the present invention may withstand shock, be bent, or depressed, and if permitted, will return to its original configuration.

The following examples are given as specific illustrations of the invention. It should be understood, however, that the invention is not limited to the specific details set forth in the examples.

EXAMPLE I

A cellulose foam is prepared by agitating in a mixing vessel 25 parts by weight wood pulp, 40 parts by weight of a polyvinyl acetate homopolymer emulsion containing 55 percent solids by weight and having a viscosity at 25° C. of 500–1500 cps., 2 parts by weight of sodium carboxymethyl cellulose, 2 parts by weight of alkyl phenoxy ethoxy wetting agent (General Aniline 630), 250 parts by weight of water, and 50 parts by weight of boric acid in fine powder form. The average fiber length for the wood pulp is about 1/8 inch. The polyvinyl acetate homopolymer emulsion on a solids basis contains 6.6 percent by weight nonylphenoxy (polyethyleneoxy) ethenoxy surfactants and 1.5 percent by weight of hydroxy ethyl cellulose, and is prepared by use of a potassium persulfate catalyst. A rigid sheet of solid foam of approximately 1 cm. in height with a bulk density of 0.15 gm./cc. is obtained by casting the foam in a thickness of about 1/2 inch on a Teflon support, and then drying in an oven at 120° C. for about 2 hours.

The dried foam is placed in a muffle furnace and gradually heated in an air atmosphere to a temperature 450° C. over a period of ten minutes. The foam is maintained at 450° C. for five minutes and the pyrolysis treatment is completed. The product has a black appearance and retains the cellular configuration of the original cellulose foam prior to pyrolysis. At room temperature the product exhibits no resiliency, however, when the product is maintained at the temperature of about 250° C. and above, enhanced resiliency is exhibited. Following depression at 260° C. the product will promptly recover to its original form without deleterious results. When placed in a flame the product glows in those areas which are in direct contact with the flame, but does not support combustion, smoke or evolve poisonous gases. The product is accordingly suited for applications in which a material is required which exhibits no deleterious properties when its "total fire hazard" is considered.

For comparative purposes a cellulose foam is prepared in all respects as described in the preceding Example I with the exception that the boric acid component is omitted. At the elevated temperature required for the pyrolysis reaction, the foam bursts into flame, and its cellular structure is destroyed.

A portion of the product of Example I was formed into a sheet having a thickness of ⅜ inch and tested. It was found that a sheet of conventional gypsum board having the same dimensions weighed approximately five times that of the pyrolyzed product. When the sheet of gypsum board was heated on one surface to a temperature of 800 to 850° C. by use of a Meeker burner, the opposite surface reached a temperature in excess of 200° C. in less than 10 minutes. When the sheet of the present invention was heated on one surface to a temperature of 800 to 850° C. by use of a Meeker burner for one hour, a maximum temperature of 160° C. was recorded on the opposite surface.

EXAMPLE II

Example I is repeated with the exception that the cellulose foam is first formed in the absence of boric acid and dried. The foam is next submerged for about thirty minutes in a saturated solution of the boric acid maintained at a temperature of about 80° C., removed from the solution and dried at a temperature of 100 to 120° C. for about 2 hours. Upon pyrolysis a product essentially identical to that produced in Example I results.

EXAMPLE III

The foregoing Example II is repeated with the exception that a conventional cellulose viscose foam or sponge is substituted for the previously described cellulose foam derived from wood pulp. Upon pyrolysis a product results which when placed in an intense flame does not burn, smoke, or evolve poisonous gases.

The present process makes possible the formation of a product having thermal and oxidative stability which undergoes no significant change in composition when subjected to the intense open flame of a Bunsen or Meeker burner. The pyrolysis treatment of the process liberates any noxious gases which may be derived from the precursor foam, and forms a product having surprisingly useful physical properties despite the severe conditions utilized in its formation.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the production of a heat and flame resistant cellular material comprising pyrolyzing at a temperature of about 400 to 700° C. an essentially moisture free solid organic foam containing a water-insoluble resin adhesive having the ability to form a continuous film upon the evaporation of water as well as being capable of withstanding pyrolysis; and having an inorganic compound substantially uniformly distributed therein selected from the group consisting of antimony oxide, boric oxide, a compound capable of yielding boric oxide upon heating, and a compound capable of yielding antimony oxide upon heating, to produce a carbonized product which retains the original cellular structure of said solid organic foam, exhibits enhanced resiliency at elevated temperatures, and is incapable of burning or evolving smoke, or poisonous gases when subjected to an intense flame or heat.

2. A process according to claim 1 in which said solid organic foam is a cellulose foam.

3. A process according to claim 1 in which said inorganic compound is boric acid.

4. A process according to claim 1 in which the pyrolysis step is conducted at about 450° C.

5. A process for the production of a heat and flame resistant cellular material comprising pyrolyzing at a temperature of about 400 to 700° C. an essentially moisture free solid cellulose foam composition comprising a fibrous cellulose material, a wetting agent, polyvinyl acetate, and boric acid, to produce a carbonized product which retains the original cellular structure of said solid cellulose foam composition, exhibits enhanced resiliency at elevated temperatures, and is incapable of burning or evolving smoke or poisonous gases when subjected to an intense flame or heat.

6. A process according to claim 5 in which said solid cellulose foam composition includes a carboxy methyl cellulose thickening agent.

7. A process for the production of a heat and flame resistant cellular material comprising pyrolyzing at a temperature of about 400 to 700° C. an essentially moisture free solid viscose foam containing a water-insoluble resin adhesive having the ability to form a continuous film upon the evaporation of water as well as being capable of withstanding pyrolysis and having boric acid substantially uniformly distributed therein to produce a carbonized product which retains the original cellular structure of said solid viscose foam, exhibits enhanced resiliency at elevated temperatures, and is incapable of burning or evolving smoke or poisonous gases when subjected to an intense flame or heat.

8. A heat and flame resistant cellular material formed by the pyrolysis at a temperature of about 400 to 700° C. of an essentially moisture free solid organic foam containing a water-insoluble resin adhesive having the ability to form a continuous film upon the evaporation of water as well as being capable of withstanding pyrolysis and having an inorganic compound substantially uniformly distributed therein selected from the group consisting of antimony oxide, boric oxide, a compound capable of yielding boric oxide on heating, and a compound capable of yielding antimony oxide upon heating; said heat resistant cellular material being capable of exhibiting enhanced resiliency at elevated temperatures, and being incapable of burning or evolving smoke or poisonous gases when subjected to an intense flame or heat.

9. A heat and flame resistant cellular material according to claim 8 in which the solid organic foam which is pyrolyzed is a cellulose foam.

References Cited

UNITED STATES PATENTS

| 3,398,019 | 8/1968 | Langguth et al. | 162—159X |
| 3,479,211 | 11/1969 | Goldstein | 162—159X |
| 3,438,847 | 4/1969 | Chase | 161—166 |
| 3,475,199 | 10/1969 | Wolf | 252—8.1X |
| 3,481,886 | 12/1969 | Lawes | 260—2.5 |
| 3,484,340 | 12/1969 | Lewin | 161—403X |
| 3,484,391 | 12/1969 | Wheatley et al. | 252—62X |
| 3,493,460 | 2/1970 | Windecker | 161—403X |
| 1,738,976 | 12/1929 | Vivas | 252—8.1X |
| 1,966,437 | 7/1934 | Bryant | 162—181X |
| 3,002,937 | 10/1961 | Parker et al. | 252—91X |
| 3,060,139 | 10/1962 | Greminger et al. | 260—17 |

(Other references on following page)

UNITED STATES PATENTS

| | | | |
|---|---|---|---|
| 3,080,333 | 5/1963 | Kray et al. | 260—17X |
| 3,162,609 | 12/1964 | Eichhorn | 252—8.1X |
| 3,164,558 | 1/1965 | Eichhorn | 252—8.1X |
| 3,202,570 | 8/1965 | Videen | 252—8.1X |
| 3,250,797 | 5/1966 | Wood et al. | 252—8.1X |
| 3,318,826 | 5/1967 | Bridgeford | 260—17.4 |

FOREIGN PATENTS 656,210    8/1951    Great Britain.

HAROLD ANSHER, Primary Examiner

U.S. Cl. X.R.

161—403; 162—159; 252—3, 8.1, 307, 350